(12) United States Patent
Chiang et al.

(10) Patent No.: US 11,386,562 B2
(45) Date of Patent: Jul. 12, 2022

(54) SYSTEMS AND METHODS FOR FOREGROUND AND BACKGROUND PROCESSING OF CONTENT IN A LIVE VIDEO

(71) Applicant: CyberLink Corp., Shindian (TW)

(72) Inventors: Ming-Hung Chiang, Taipei (TW); Cheng-hsu Lee, Taoyuan (TW)

(73) Assignee: CYBERLINK CORP., Shindian (TW)

( * ) Notice: Subject to any disclaimer, the term of this patent is extended or adjusted under 35 U.S.C. 154(b) by 84 days.

(21) Appl. No.: 16/701,763

(22) Filed: Dec. 3, 2019

(65) Prior Publication Data

US 2020/0211201 A1 Jul. 2, 2020

Related U.S. Application Data

(60) Provisional application No. 62/786,005, filed on Dec. 28, 2018.

(51) Int. Cl.
*G06T 7/194* (2017.01)
*G06T 7/11* (2017.01)
(Continued)

(52) U.S. Cl.
CPC ............ *G06T 7/194* (2017.01); *G06F 3/0482* (2013.01); *G06T 5/002* (2013.01); *G06T 7/11* (2017.01);
(Continued)

(58) Field of Classification Search
CPC . G06T 7/194; G06T 7/11; G06T 5/002; G06T 11/001; G06T 2207/10016;
(Continued)

(56) References Cited

U.S. PATENT DOCUMENTS 7,555,149 B2 6/2009 Peker et al.
7,847,815 B2 12/2010 Patel et al.
(Continued)

FOREIGN PATENT DOCUMENTS

CA 2 773 865 A1 10/2012
CN 106815560 A 6/2017
(Continued)

OTHER PUBLICATIONS

Rosebrock, A.; "Instance segmentation with OpenCV;" https://www.pyimagesearch.com/2018/11/26/instance-segmentation-with-opencv/; Nov. 2018; pp. 1-25.
(Continued)

*Primary Examiner* — Michelle Chin
(74) *Attorney, Agent, or Firm* — McClure, Qualey & Rodack, LLP

(57) ABSTRACT

A computing device generates a user interface that includes a viewing window and a toolbar including a selection tool. The computing device displays a live video depicting one or more individuals in the viewing window of the user interface and generates a segmentation mask for each individual depicted in the live video, where each segmentation mask comprises facial feature vectors of a facial region of each individual. The computing device obtains selection of an individual depicted in the live video and compares facial feature vectors of each of the individuals depicted in the live video with the facial feature vector of the selected individual. The computing device converts the segmentation masks of individuals with corresponding facial feature vectors that do not match the selected facial feature vector to a filter mask and composites the filter mask with a background content of the live video.

15 Claims, 10 Drawing Sheets

(51) Int. Cl.

| | | |
|---|---|---|
| *G06T 5/00* | (2006.01) | |
| *G06T 11/00* | (2006.01) | |
| *G06F 3/0482* | (2013.01) | |
| *H04N 5/265* | (2006.01) | |
| *G06V 10/75* | (2022.01) | |
| *G06V 40/16* | (2022.01) | |
| *H04N 7/15* | (2006.01) | |

(52) U.S. Cl.
CPC .......... *G06T 11/001* (2013.01); *G06V 10/751* (2022.01); *G06V 40/161* (2022.01); *H04N 5/265* (2013.01); *G06T 2200/24* (2013.01); *G06T 2207/10016* (2013.01); *G06T 2207/30201* (2013.01); *H04N 7/15* (2013.01)

(58) Field of Classification Search
CPC ....... G06T 2207/30201; G06T 2200/24; G06F 3/0482; G06K 9/00228; G06K 9/6202; H04N 5/265; H04N 7/15; G06V 10/751; G06V 40/161
See application file for complete search history.

(56) References Cited

U.S. PATENT DOCUMENTS

| | | | |
|---|---|---|---|
| 8,265,392 | B2 | 9/2012 | Wang et al. |
| 8,355,039 | B2 | 1/2013 | Michrowski et al. |
| 8,363,908 | B2 | 1/2013 | Steinberg et al. |
| 8,363,951 | B2 | 1/2013 | Steinberg et al. |
| 8,965,067 | B2 | 2/2015 | Fröjdh et al. |
| 9,282,287 | B1 | 3/2016 | Marsh |
| 9,467,650 | B2 | 10/2016 | Jing et al. |
| 9,571,792 | B2 | 2/2017 | Abou-Chakra et al. |
| 9,692,950 | B2 | 6/2017 | Chang et al. |
| 9,875,431 | B2 | 1/2018 | Ikeda |
| 9,948,893 | B2 | 4/2018 | Barzuza et al. |
| 2007/0127774 | A1 | 6/2007 | Zhang et al. |
| 2008/0260212 | A1* | 10/2008 | Moskal ............. G06K 9/00315 382/118 |
| 2008/0278487 | A1 | 11/2008 | Gobert |
| 2009/0210491 | A1 | 8/2009 | Thakkar et al. |
| 2009/0324023 | A1 | 12/2009 | Tina et al. |
| 2010/0007665 | A1* | 1/2010 | Smith ..................... G06T 13/40 345/473 |
| 2010/0110481 | A1 | 5/2010 | Do et al. |
| 2010/0149305 | A1 | 6/2010 | Catchpole et al. |
| 2011/0242277 | A1 | 10/2011 | Do et al. |
| 2012/0051658 | A1* | 3/2012 | Tong .................. G11B 27/034 382/224 |
| 2012/0082370 | A1* | 4/2012 | Yasukawa ........... G06K 9/6215 382/209 |
| 2012/0159290 | A1 | 6/2012 | Pulsipher et al. |
| 2012/0233015 | A1 | 9/2012 | Calman et al. |
| 2012/0327172 | A1 | 12/2012 | El-Saban et al. |
| 2015/0066820 | A1* | 3/2015 | Kapur ................... G06N 20/00 706/12 |
| 2015/0082349 | A1* | 3/2015 | Ishtiaq ............... H04N 21/4884 725/40 |
| 2015/0195491 | A1 | 7/2015 | Shaburov et al. |
| 2016/0173821 | A1 | 6/2016 | De Magalhaes |
| 2017/0054902 | A1 | 2/2017 | Park |
| 2018/0268200 | A1 | 9/2018 | Bandameedipalli et al. |
| 2020/0082154 | A1* | 3/2020 | Hussain ............... G06V 40/162 |

FOREIGN PATENT DOCUMENTS

| | | |
|---|---|---|
| EP | 2 920 958 | 9/2015 |
| EP | 3 101 839 A1 | 12/2016 |
| KR | 10-0827848 B1 | 5/2008 |
| KR | 10-1840594 B1 | 3/2018 |
| WO | 2014/100455 A1 | 6/2014 |
| WO | 2014/207991 A1 | 12/2014 |
| WO | 2017/000115 A1 | 1/2017 |

OTHER PUBLICATIONS

Li, H., et al.; "Faceseg: Automatic Face Segmentation For Real-Time Video".

* cited by examiner

SYSTEMS AND METHODS FOR FOREGROUND AND BACKGROUND PROCESSING OF CONTENT IN A LIVE VIDEO

CROSS-REFERENCE TO RELATED APPLICATION

This application claims priority to, and the benefit of, U.S. Provisional Patent Application entitled, "A Method of Keeping an Identified Person in a Video Foreground and Process Background," having Ser. No. 62/786,005, filed on Dec. 28, 2018, which is incorporated by reference in its entirety.

TECHNICAL FIELD

The present disclosure generally relates to systems and methods for foreground and background processing of content in a live video.

BACKGROUND

Live video communication over the Internet is a popular means of communications among users around the world as video communication applications allow users to engage in live, face-to-face sessions. Occasionally, other individuals may inadvertently enter the field of view in the background while a participant is engaging in a live video conferencing session. This can be distracting to other participants viewing the live video.

SUMMARY

In accordance with one embodiment, a computing device generates a user interface, the user interface including a viewing window, the user interface further comprising a toolbar including a selection tool. The computing device displays a live video depicting at least one individual in the viewing window of the user interface. The computing device generates at least one segmentation mask for the at least one individual depicted in the live video, wherein the at least one segmentation mask comprises facial feature vectors of a facial region of each individual, wherein each facial feature vector is generated from facial features of each individual.

The computing device obtains selection of at least one individual depicted in the live video based on operation of the selection tool to designate at least one selected facial feature vector corresponding to the selected at least one individual. The computing device compares facial feature vectors in a facial region of each of individuals depicted in the live video with the selected at least one facial feature vector corresponding to the selected at least one individual.

The computing device converts the segmentation masks of individuals with corresponding facial feature vectors that do not match the selected facial feature vector to a filter mask and composites the filter mask comprising facial feature vectors that do not match the selected facial feature vector with a background content of the live video to generate composited background content. The computing device applies a graphical effect to the composited background content and displays a modified video comprising the segmentation mask and the composited background content when the selected at least one individual is in a field of view of the webcam.

Another embodiment is a system that comprises a memory storing instructions and a processor coupled to the memory. The processor is configured by the instructions to generate a user interface, the user interface including a viewing window, the user interface further comprising a toolbar including a selection tool. The processor is further configured to display a live video depicting at least one individual in the viewing window of the user interface. The processor is further configured to generate at least one segmentation mask for the at least one individual depicted in the live video, wherein the at least one segmentation mask comprises facial feature vectors of a facial region of each individual, wherein each facial feature vector is generated from facial features of each individual.

The processor is further configured to obtain selection of at least one individual depicted in the live video based on operation of the selection tool to designate at least one selected facial feature vector corresponding to the selected at least one individual. The processor is further configured to compare facial feature vectors in a facial region of each of individuals depicted in the live video with the selected at least one facial feature vector corresponding to the selected at least one individual.

The processor is further configured to convert the segmentation masks of individuals with corresponding facial feature vectors that do not match the selected facial feature vector to a filter mask. The processor is further configured to composite the filter mask comprising facial feature vectors that do not match the selected facial feature vector with a background content of the live video to generate composited background content. The processor is further configured to apply a graphical effect to the composited background content and display a modified video comprising the segmentation mask and the composited background content when the selected at least one individual is in a field of view of the webcam.

Another embodiment is a non-transitory computer-readable storage medium storing instructions to be implemented by a computing device having a processor, wherein the instructions, when executed by the processor, cause the computing device to generate a user interface, the user interface including a viewing window, the user interface further comprising a toolbar including a selection tool. The processor is further configured to display a live video depicting at least one individual in the viewing window of the user interface. The processor is further configured to generate at least one segmentation mask for the at least one individual depicted in the live video, wherein the at least one segmentation mask comprises facial feature vectors of a facial region of each individual, wherein each facial feature vector is generated from facial features of each individual.

The processor is further configured to obtain selection of at least one individual depicted in the live video based on operation of the selection tool to designate at least one selected facial feature vector corresponding to the selected at least one individual. The processor is further configured to compare facial feature vectors in a facial region of each of individuals depicted in the live video with the selected at least one facial feature vector corresponding to the selected at least one individual.

The processor is further configured to convert the segmentation masks of individuals with corresponding facial feature vectors that do not match the selected facial feature vector to a filter mask. The processor is further configured to composite the filter mask comprising facial feature vectors that do not match the selected facial feature vector with a background content of the live video to generate composited background content. The processor is further configured to apply a graphical effect to the composited background content and display a modified video comprising the segmentation mask and the composited background content when the selected at least one individual is in a field of view of the webcam Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Although many video conferencing applications are available that allow users to engage in live, face-to-face sessions, one common issue relates to other individuals inadvertently entering the field of view in the background while a participant is engaging in a live video conferencing session. This can be distracting to other participants at remote locations viewing the live video. Various embodiments are disclosed for implementing an improved video conferencing system that performs foreground and background processing of content (e.g., individuals and objects) in a live video.

The improved techniques disclosed herein allow a user to select one or more individuals in a live video to remain in the foreground while other individuals and/or objects that are not selected undergo background processing and are effectively hidden from view. Specifically, individuals with segmentation masks that are included as part of the foreground content are displayed while individual(s) and objects that are not included in the foreground segmentation mask are composited with the background, where a graphical effect such as a blurriness effect, color substitution effect, a replacement image inserted in place of the individuals not included in the foreground segmentation mask, or replacement video animation inserted in place of the individuals not included in the foreground segmentation mask is applied to the background to de-emphasize the content in the background.

In the context of this disclosure, segmentation masks include both the facial region and the body of individuals, whereas the information contained in facial feature vectors are generally limited to features in the facial region of individuals. Segmentation masks of individuals that are not selected to remain in view are converted to a filter mask. The filter mask is composited with the background to effectively hide the images of individuals that are not selected to remain in view. The processing disclosed herein is performed in real time, and a modified video is output for other participants to view. A technical effect of various embodiments is that individuals that inadvertently enter the field of view during a live video conferencing session are effectively hidden from view. This feature may be useful, for example, for protecting the privacy of family members and/or friends of the video conference participant when one or more of the participants are at home or in a public area. In other cases, when the video conference participants are conducting the video conference in an office setting or work environment, objects located behind the participants can be hidden. This feature may be useful in instances where the participant may forget that sensitive information written on a blackboard, for example, is within the field of view.

Figure 1:
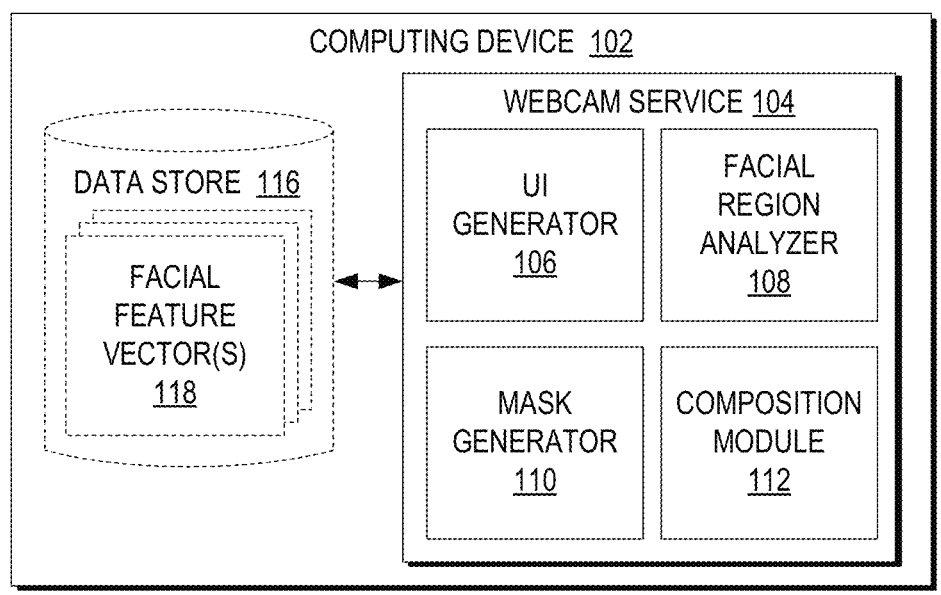
FIG. 1 is a block diagram of a computing device for performing foreground and background processing of content in a live video in accordance with various embodiments of the present disclosure.

A description of a system for performing foreground and background processing of content in a live video is now described followed by a discussion of the operation of the components within the system. FIG. 1 is a block diagram of a computing device 102 in which the techniques for virtual application of makeup effects based on a source image disclosed herein may be implemented. The computing device 102 may be embodied as a computing device such as, but not limited to, a smartphone, a tablet computing device, a laptop, and so on.

A webcam service 104 executes on a processor of the computing device 102 and includes a UI generator 106, a facial region analyzer 108, a mask generator 110, and a composition module 112. The UI generator 106 is configured to generate a user interface that includes a viewing window for displaying a live video depicting one or more individuals during a video conferencing session.

As one of ordinary skill will appreciate, the live video may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The user interface provided by the UI generator 106 also comprises a selection tool for allowing users to select one or more individuals, where the selected individuals remain in view as part of the foreground while content in the background is de-emphasized or hidden. The UI generator 106 obtains a selection of one or more individuals depicted in the live video based on operation of the selection tool.

The facial region analyzer 108 is configured to analyze the facial region of each of the individuals depicted in the live video and generate corresponding facial feature vectors 118. The facial feature vectors 118 may include, for example, attributes of landmark facial features of the one or more selected individuals. Note that in accordance with exemplary embodiments, the information contained in the facial feature vectors 118 is generally limited to the facial region of the one or more selected individuals. The facial feature vectors 118 are stored in a data store 116 of the computing device 102. In accordance with various embodiments, facial feature vectors may be derived, for example, by facial recognition techniques applied by a learning computing device.

The mask generator 110 is configured to analyze the live video being displayed in the user interface and identify individuals depicted in the live video. Based on this, the mask generator 110 generates a separate segmentation mask for each individual depicted in the live video. Note that for other embodiments, the mask generator 110 may be configured to generate a single segmentation mask for all the individuals depicted in the live video. The segmentation masks may be generated using, for example, a boundary-sensitive network technique or a boundary-aware network technique.

The mask generator 110 is further configured to compare the facial features 118 in the facial region of each of the individuals depicted in the live video with the selected facial feature vector(s) 118. Based on this, the mask generator 110 converts the segmentation masks of individuals with corresponding facial feature vectors 118 that do not match the selected facial feature vector(s) 118 to a filter mask. The segmentation masks that match the selected facial feature vector(s) 118 are not converted to the filter mask and thereby remain in the foreground.

The composition module 112 is configured to composite the filter mask with a background content of the live video. For some embodiments, the composition module 112 is also configured to composite objects associated with the filter mask with a background content of the live video. The composition module 112 is further configured to apply a graphical effect to the composited background content and display a modified video comprising one or more foreground segmentation masks and the composited background content when the selected individual(s) are in a field of view of the webcam.

Figure 2:
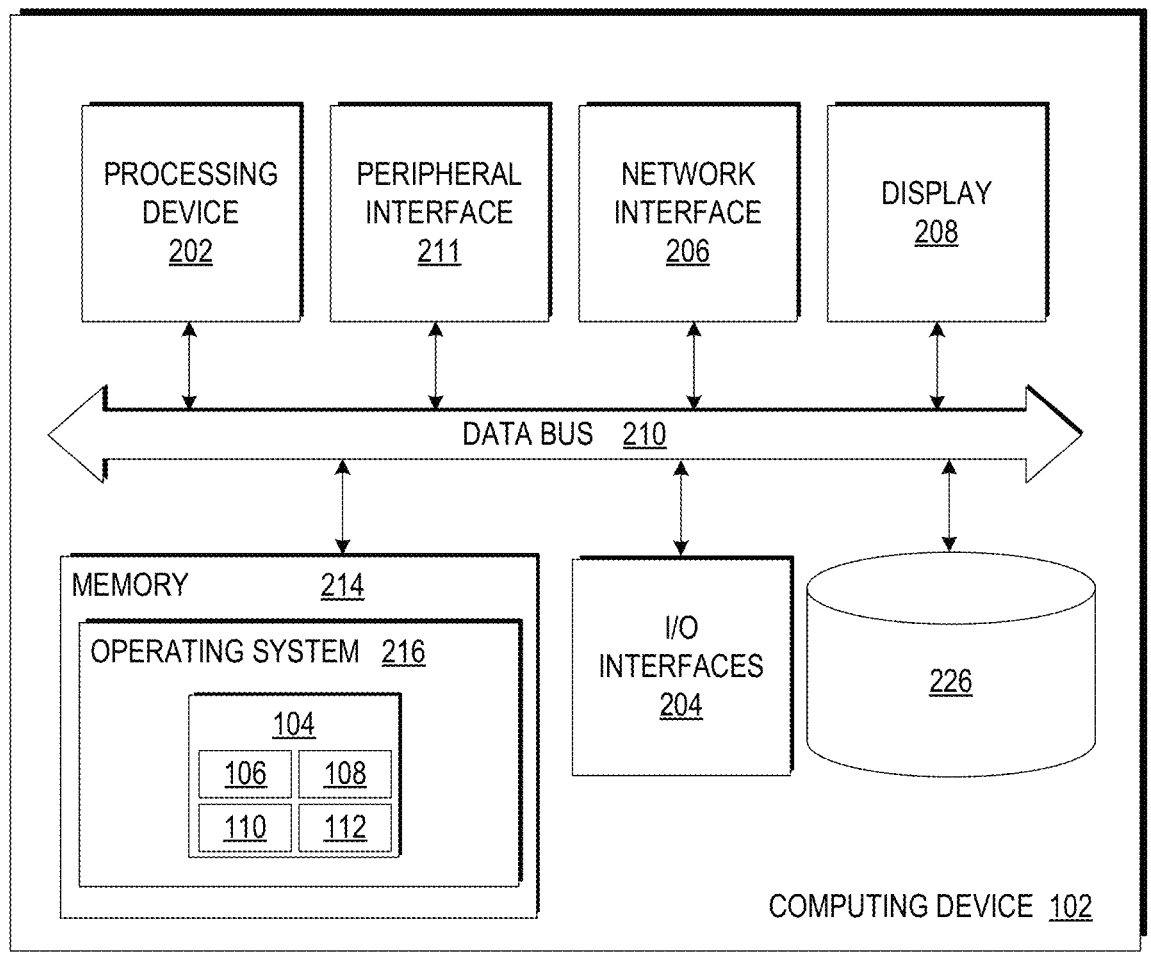
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multi-processor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202, thereby causing the processing device 202 to perform the operations/functions disclosed herein. One of ordinary skill in the art will appreciate that the memory 214 can, and typically will, comprise other components which have been omitted for purposes of brevity. For some embodiments, the components in the computing device 102 may be implemented by hardware and/or software.

Input/output interfaces 204 provide any number of interfaces for the input and output of data. For example, where the computing device 102 comprises a personal computer, these components may interface with one or more input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
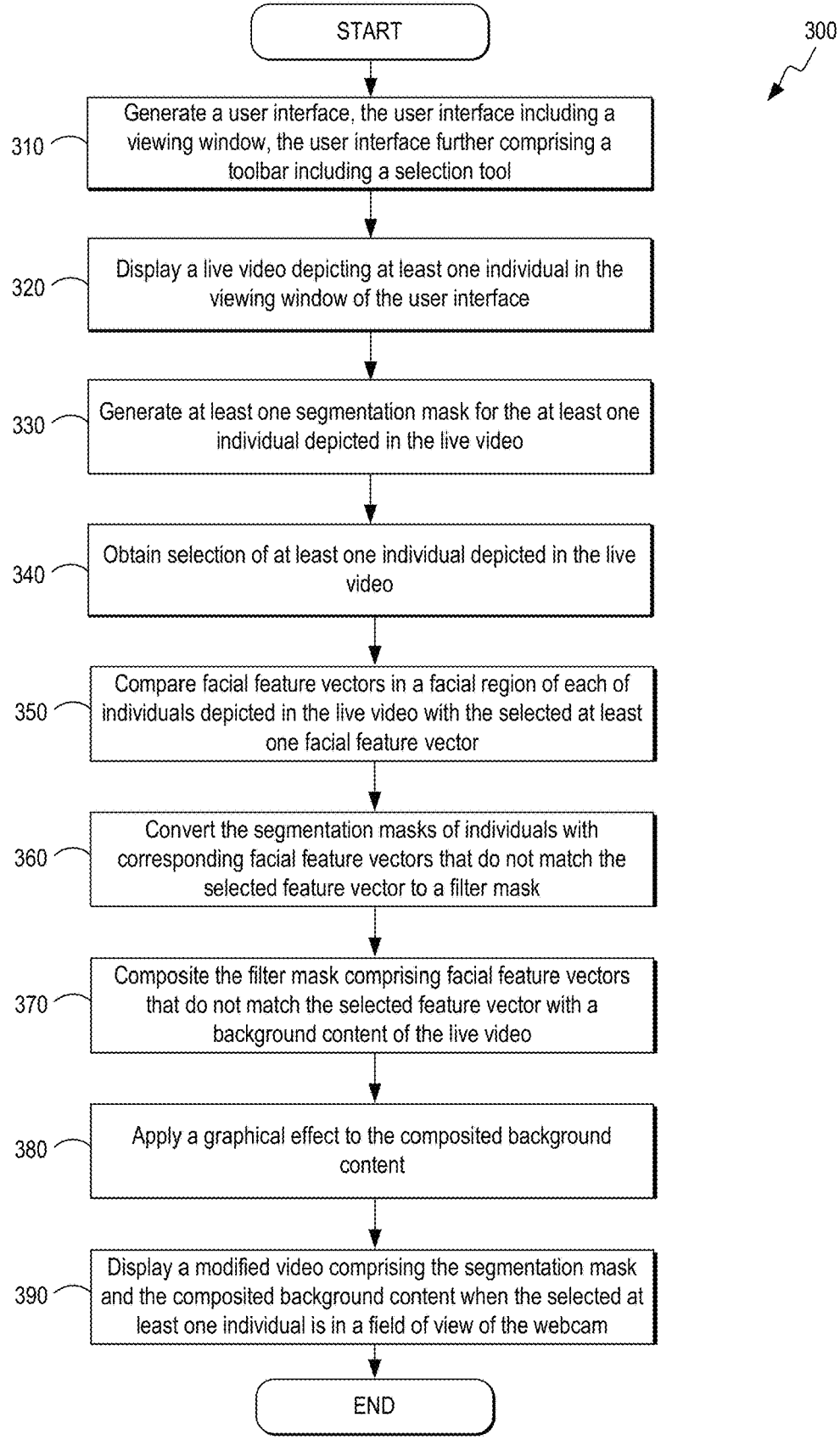
FIG. 3 is a top-level flowchart illustrating examples of functionality implemented as portions of the computing device of FIG. 1 for foreground and background processing of content in a live video according to various embodiments of the present disclosure.

Reference is made to FIG. 3, which is a flowchart 300 in accordance with various embodiments for foreground and background processing of content in a live video performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 generates a user interface, the user interface including a viewing window, the user interface further comprising a toolbar including a selection tool. At block 320, the computing device 102 displays a live video depicting at least one individual in the viewing window of the user interface.

At block 330, the computing device 102 generates at least one segmentation mask for the at least one individual depicted in the live video, wherein the at least one segmentation mask comprises facial feature vectors 118 of a facial region of each individual, wherein each facial feature vector 118 is generated from facial features of each individual. For some embodiments, a separate segmentation mask is generated for each individual. For other embodiments, a single segmentation mask is generated for all the individuals. For some embodiments, each segmentation mask comprises a facial region and a body region of each individual, and wherein the facial feature vector 118 comprises only features of a facial region of each individual.

At block 340, the computing device 102 obtains selection of at least one individual depicted in the live video based on operation of the selection tool to designate a selected at least one facial feature vector 118 corresponding to the selected at least one individual. At block 350, the computing device 102 compares facial feature vectors 118 in a facial region of each of individuals depicted in the live video with the selected at least one facial feature vector 118 corresponding to the selected at least one individual.

At block 360, the computing device 102 converts the segmentation masks of individuals with corresponding facial feature vectors 118 that do not match the selected facial feature vector 118 to a filter mask. At block 370, the computing device 102 composites the filter mask comprising facial feature vectors 118 that do not match the selected facial feature vector 118 with a background content of the live video.

At block 380, the computing device 102 applies a graphical effect to the composited background content. For some embodiments, the graphical effect comprises a blurriness effect where the user interface further comprises an adjustment tool for adjusting a degree in which the blurriness effect is applied to the composited background content. For some embodiments, the graphical effect comprises a color substitution effect whereby a color is substituted for the entire composited background content.

For some embodiments, the graphical effect comprises replacement multimedia content inserted in place of the individuals associated with the removed foreground segmentation masks, wherein the multimedia content comprises at least one of an image or a video. In accordance with some embodiments, the user interface further comprises a color tool for selecting the color of the color substitution effect.

At block 390, the computing device 102 displays a modified video comprising the segmentation mask and the composited background content when the selected at least one individual is in a field of view of the webcam. For some embodiments, the selection obtained based on operation of the selection tool comprises a plurality of individuals depicted in the live video, and the displayed modified video comprises a plurality of segmentation masks and the composited background content.

For some embodiments, the modified video comprises only the composited background content when the selected at least one individual is not in the field of view of the webcam. For some embodiments, if the one or more selected individuals exit and re-enter the field of view of the webcam, only the operations in block 350 to block 390 are repeated. Thereafter, the process in FIG. 3 ends.

Figure 4:
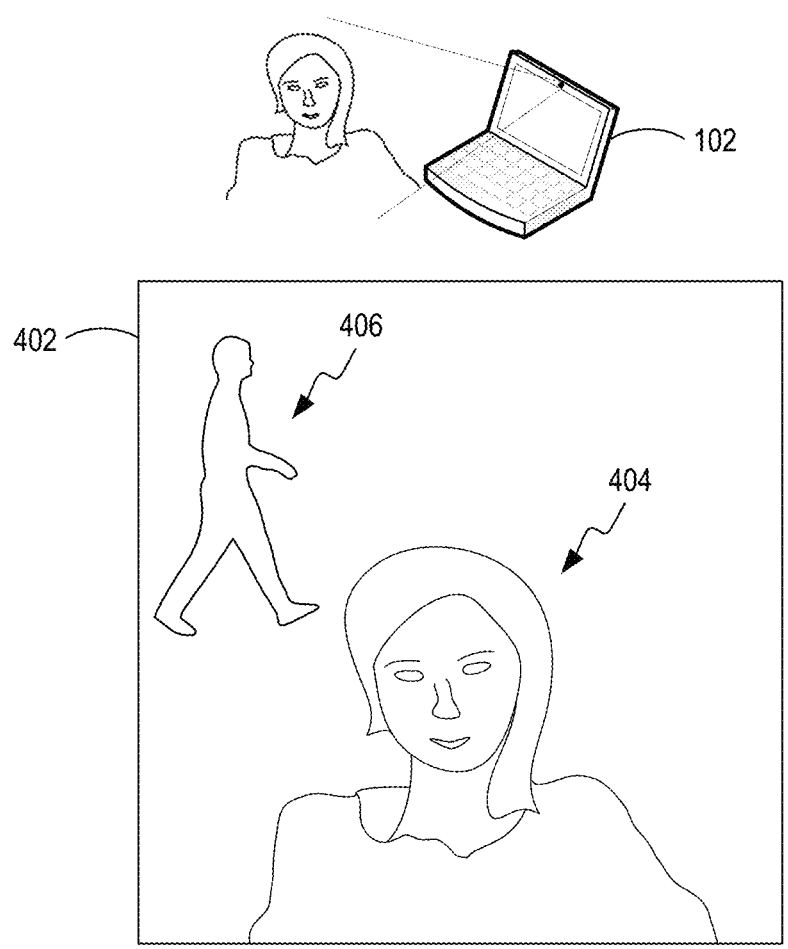
FIG. 4 illustrates an exemplary setup where the computing device in FIG. 1 is equipped with a webcam for conducting a live video conference according to various embodiments of the present disclosure.

Having described the basic framework of a system for performing for foreground and background processing of content in a live video, reference is made to the following figures, which further illustrate various features disclosed above. Reference is made to FIG. 4, which shows an exemplary setup where the computing device 102 is equipped with a webcam for conducting a live video conference. A user interface with a viewing window 402 is shown whereby a first individual 404 (i.e., a video conference participant) participating in the live video conference is shown. Also shown is a second individual 406 walking in the background within the field of view of the webcam. Assume for this example that the second individual 406 will not selected to remain in the foreground.

For some embodiments, a separate segmentation mask is generated for each individual 404, 406 depicted in the live video, where the each segmentation mask comprises facial feature vectors 118 of a facial region of each individual 404, 406, and where each facial feature vector 118 is generated from facial features of each individual. For other embodiments, a single segmentation mask is generated for all the individuals 404, 406 depicted in the live video. The facial feature vectors 118 of the segmentation masks are stored in the data store 116 (FIG. 1).

Figure 5:
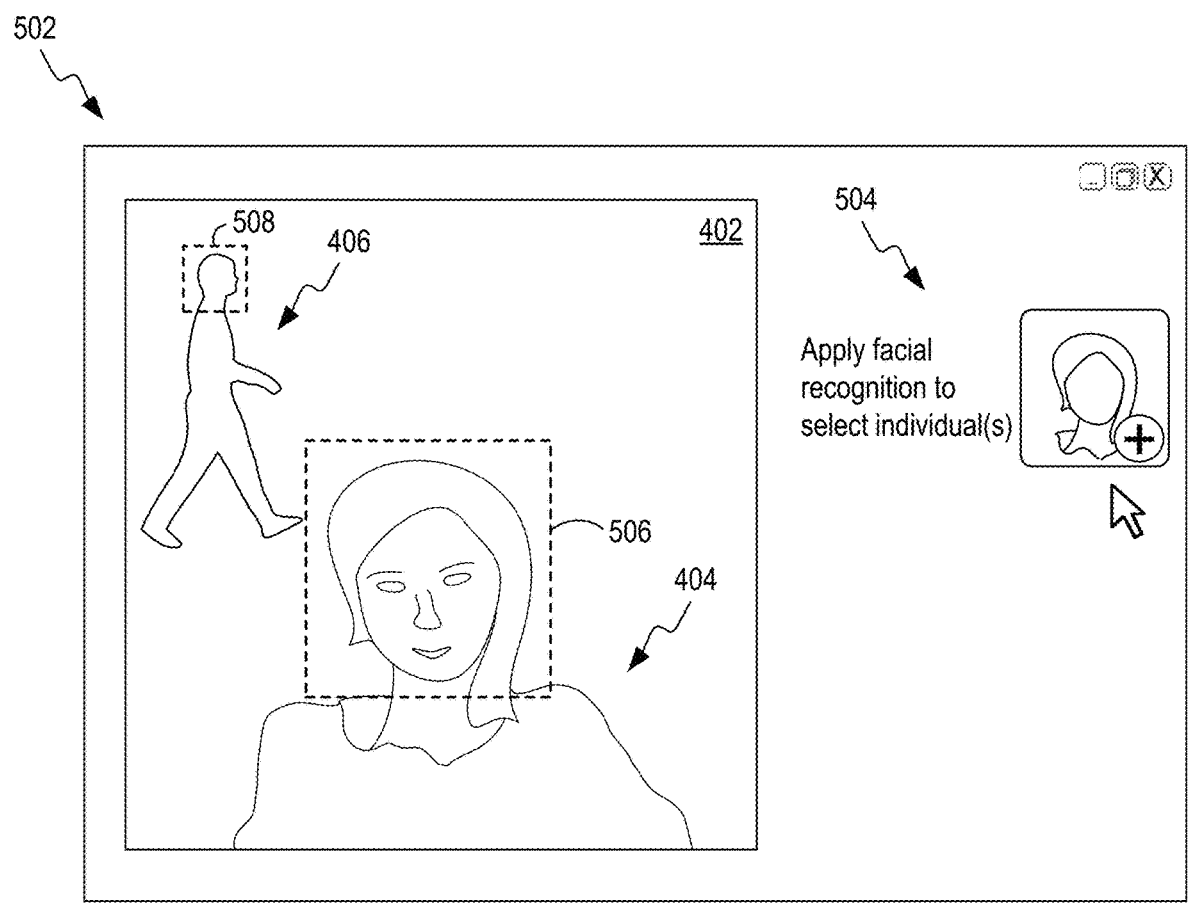
FIG. 5 illustrates an example user interface that includes a viewing window and a selection tool according to various embodiments of the present disclosure.

FIG. 5 illustrates an example user interface 502 in accordance with various embodiments, where the user interface 502 includes a viewing window 402 and a selection tool 504. A user utilizes the selection tool 504 to select one or more individuals 404, 406 depicted in the live video shown in the viewing window 402. For some embodiments, when the user invokes the selection tool 504, regions 506, 508 (e.g., square regions defined by dashed lines) surrounding the facial regions of the individuals 404, 406 are shown to the user.

Figure 6:
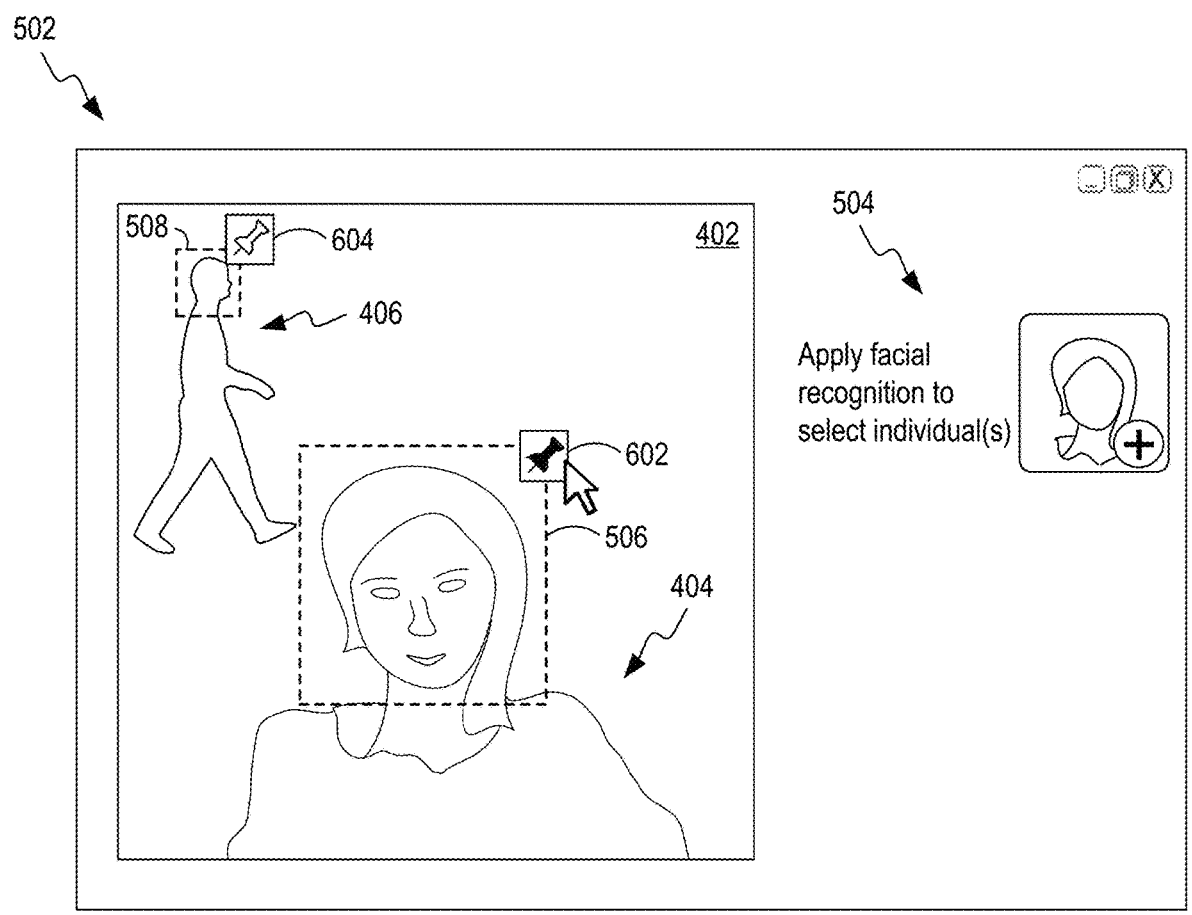
FIG. 6 illustrates selection of an individual through the use of a pin-up button according to various embodiments of the present disclosure.

Referring to FIG. 6, the user then selects a region 506 to select the corresponding individual 404, where selection of the region 506 may be accomplished, for example, by hovering a cursor over and pressing a pin-up button 602 or invoking other selection means. Once the individual 404 is selected, the corresponding facial feature vector 118 is retrieved from the data store 116. This facial feature vector 118 is later utilized to identify which individual is to be included as part of the foreground portion of the live video. In the example shown, the second individual 406 is not selected, as reflected by the inactive state of the corresponding pin-up button 604.

Figure 7:
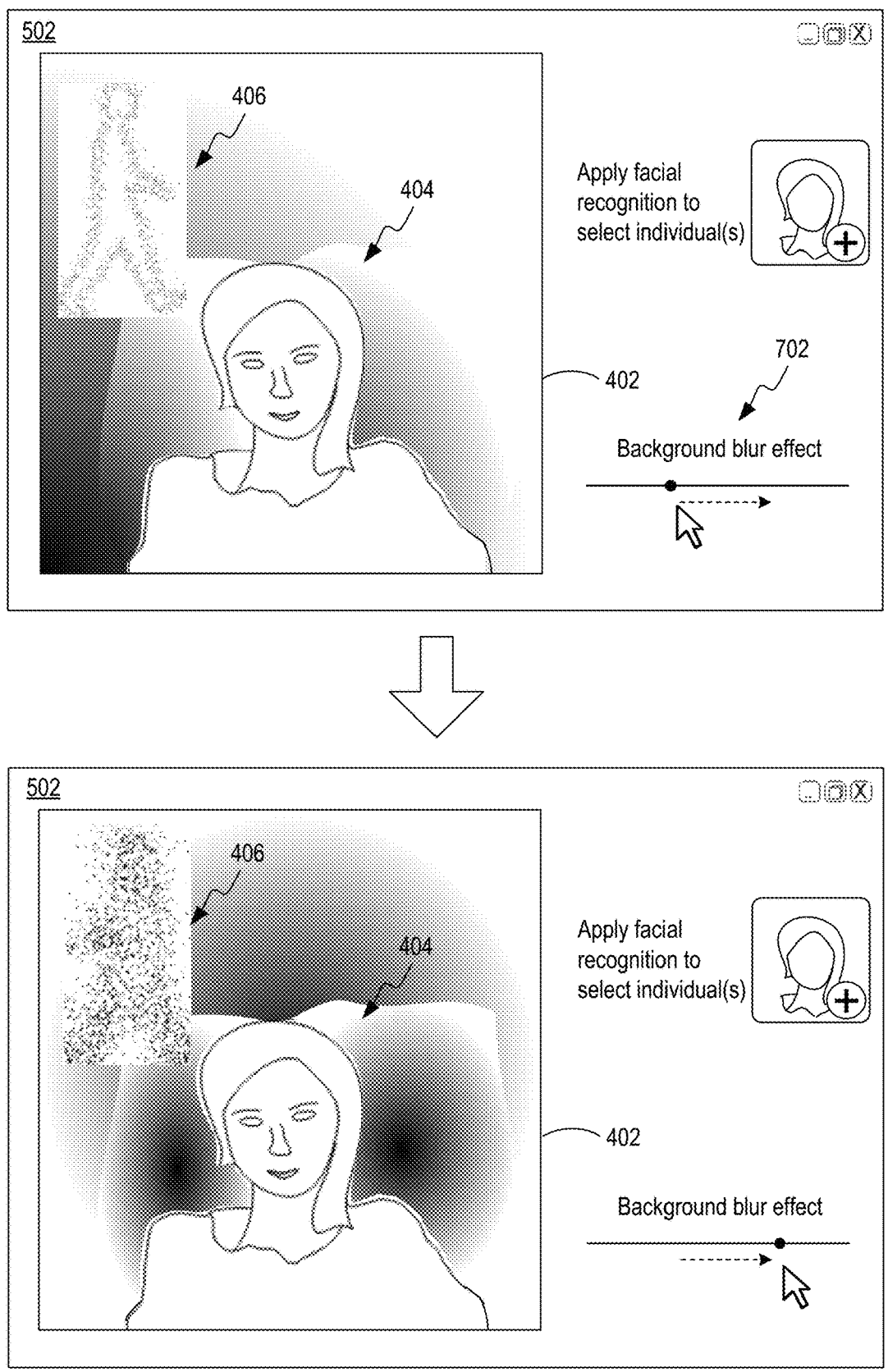
FIG. 7 illustrates the application of a graphical effect to an individual with facial features that do not match the facial feature vector according to various embodiments of the present disclosure.

FIG. 7 illustrates the application of a graphical effect to an individual with facial features that do not match the facial feature vector 118 of the selected individual 404. A comparison is performed between facial features in the facial region of each segmentation mask and the facial feature vector 118 of the selected individual. The segmentation masks of individuals with corresponding facial features that do not match the facial feature vector 118 are converted to a filter mask, and these individuals associated with the generated filter mask are composited with a background content of the live video.

A graphical effect is then applied to the composited background content, and a modified video comprising the foreground segmentation mask and the composited background content is displayed when the selected one individual is in a field of view of the webcam. Assume for the example shown in FIG. 7 that the facial features of the facial region of the second individual 406 do not match the facial feature vector 118. As a result, the segmentation mask of the second individual 406 is converted to a filter mask, and the filter mask containing the image of the second individual 406 is composited with the background content of the live video.

In the example shown, the graphical effect comprises a blurriness effect, where the user interface 502 further comprises an adjustment tool 702 for adjusting a degree in which the blurriness effect is applied to the composited background content. As shown, the user uses the adjustment tool 702 to increase the degree of blurriness applied to the composited background content. An image of the selected individual 404 is shown, while the image of the second individual 406 is de-emphasized or effectively hidden from view.

Figure 8:
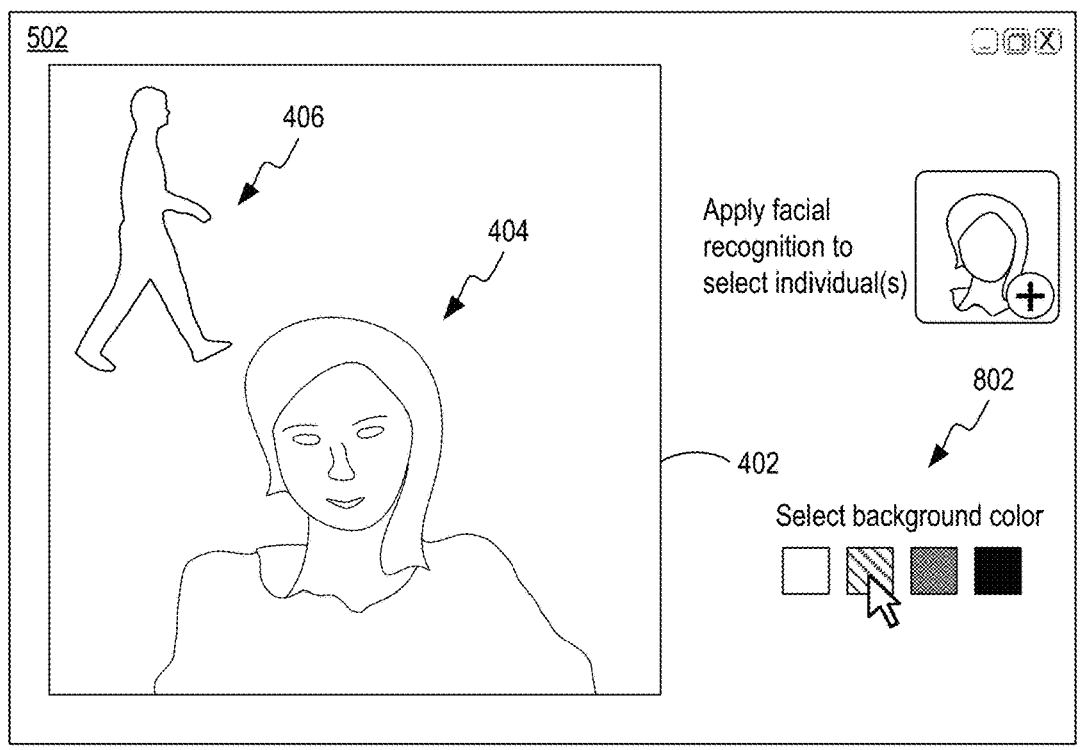
FIG. 8 illustrates an example where the graphical effect comprises a color substitution effect according to various embodiments of the present disclosure.
Figure 8:
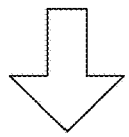
Figure 8:
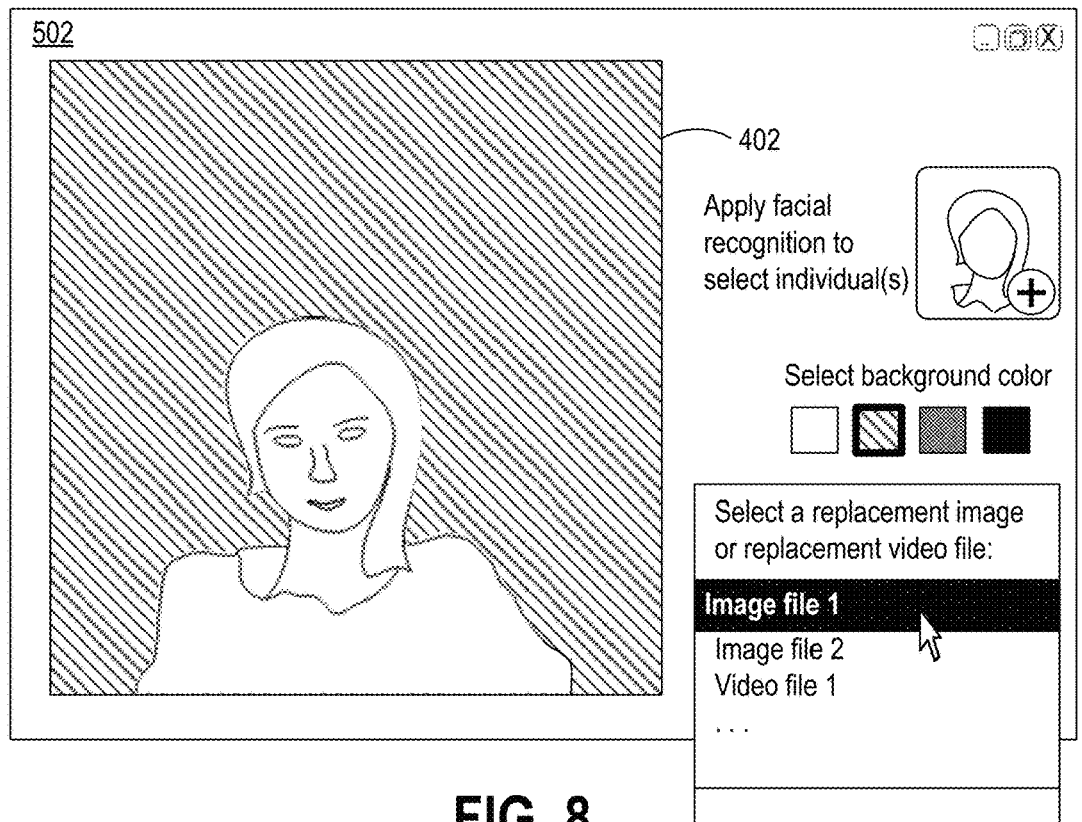

Reference is made to FIG. 8. In some embodiments, the graphical effect comprises a color substitution effect whereby a color is substituted for the entire composited background content. For such embodiments, the user interface 502 further comprises a color tool 802 that the user utilizes for selecting the color of the color substitution effect. As shown, the color selected using the color tool 802 is applied to the composited background content, which includes the filter mask containing an image of the second individual 406. Again, an image of the selected individual 404 is shown, while the image of the second individual 406 is effectively hidden from view.

For some embodiments, other graphical effects such as a replacement image or replacement video animation may be applied to the background to de-emphasize the content in the background. In the context of this disclosure, a replacement image is inserted in place of the individuals not included in the segmentation mask. Similarly, a replacement video animation is inserted in place of the individuals not included in the segmentation mask and applied to the background to de-emphasize the content in the background. As shown in the example user interface 502 in FIG. 8, the user may also select an image or a video to be applied to the background. Note that the image or video to be applied to the background can be imported from an external source (e.g., the cloud) by the user.

Figure 9:
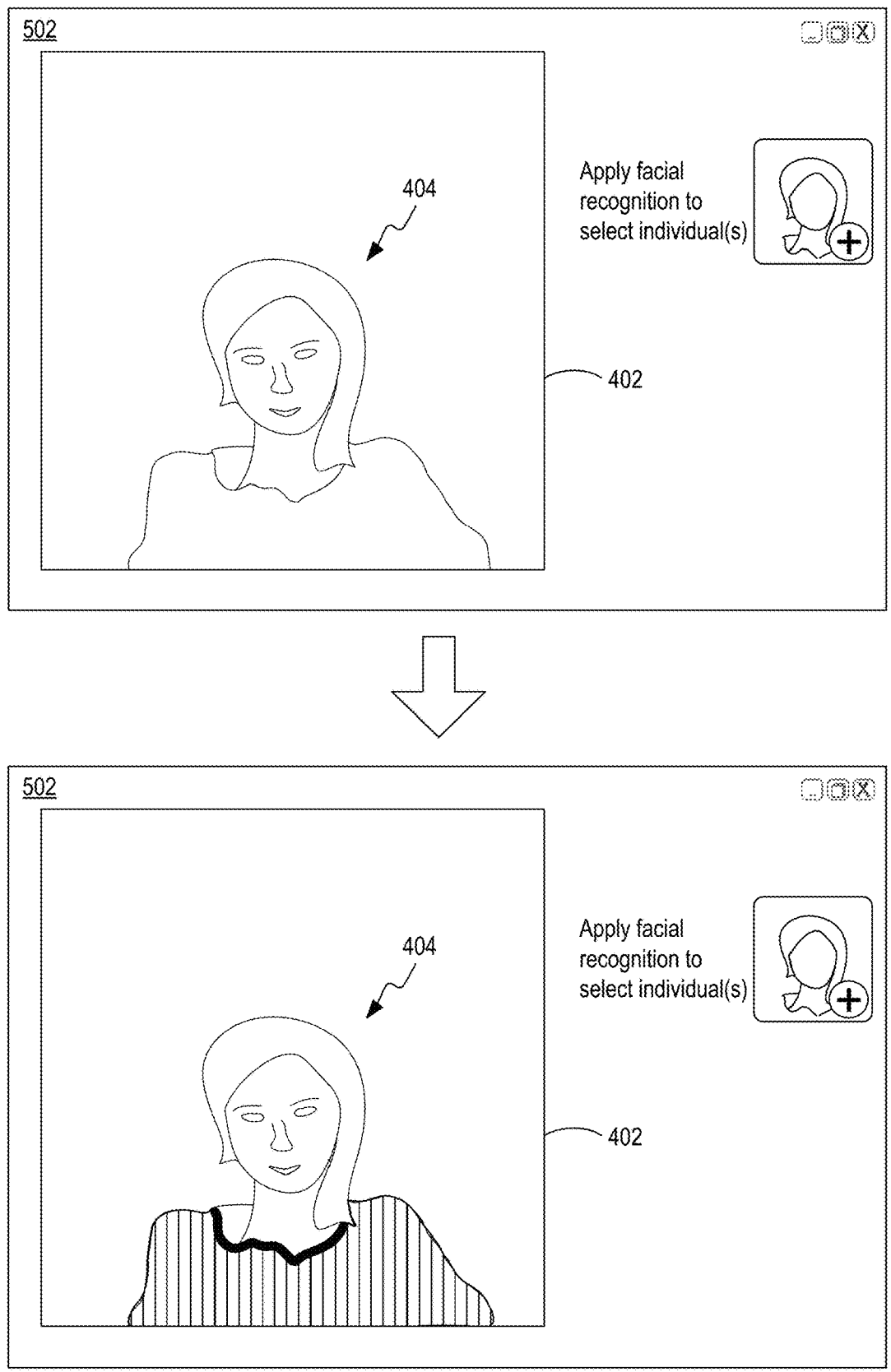
FIG. 9 illustrates an example where the selected individual remains in the foreground content despite changing appearances according to various embodiments of the present disclosure.

FIG. 9 illustrates an example where the selected individual 404 remains in the foreground content even after the individual 404 momentarily disappears (e.g., exits the room) and reappears despite changing appearances. In the illustration shown, the selected individual 404 changes clothing. Assume, for example, that the individual 404 left the room to put on a sweater and returned. As features from only the facial region rather than the entire body of the individual in each segmentation mask are compared with the facial feature vector 118 (FIG. 1), the segmentation region of the individual 404 is not converted to a filter mask because the facial features of the individual 404 match the facial feature vector 118. The image of the individual 404 therefore remains in view.

Figure 10:
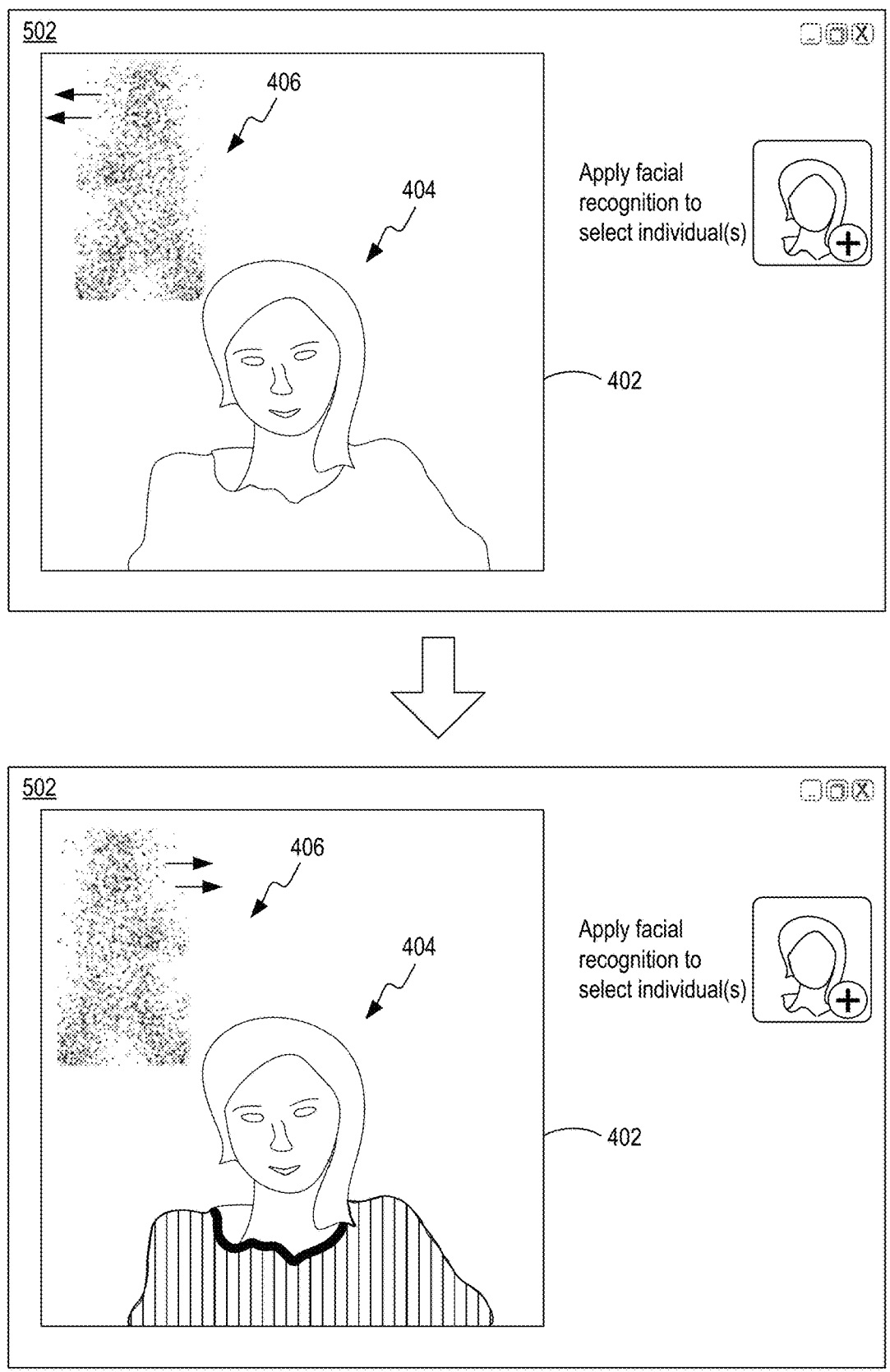
FIG. 10 illustrates another example where the selected individual remains in the foreground content despite changing appearances according to various embodiments of the present disclosure.

FIG. 10 illustrates a similar example where the selected individual 404 remains in the foreground content even after the individual 404 momentarily disappears (e.g., exits the room) and reappears despite changing appearances. Again, in the illustration shown, the selected individual 404 changes clothing. Assume, for example, that the individual 404 left the room to put on a sweater and returned. As features from only the facial region rather than the entire body of the individual in each segmentation mask are compared with the facial feature vector 118 (FIG. 1), the segmentation region of the individual 404 is not converted to a filter mask because the facial features of the individual 404 match the facial feature vector 118. The image of the individual 404 therefore remains in view. On the other hand, because the segmentation mask of the other individual 406 was converted to a filter mask, the individual 406 remains hidden from view even after exiting and re-entering the field of view.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device having a webcam, comprising:

generating a user interface, the user interface including a viewing window, the user interface further comprising a toolbar including a selection tool;

displaying a live video depicting at least one individual in the viewing window of the user interface;

generating at least one segmentation mask for the at least one individual depicted in the live video, wherein each of the at least one segmentation mask comprises a body region of each individual and facial feature vectors of a facial region of each individual, wherein each facial feature vector is generated from facial features of each individual, wherein the facial feature vectors are derived by a facial recognition technique, and wherein a separate segmentation mask is generated for each individual, each separate segmentation mask comprising a body region and facial feature vectors of a facial region of a corresponding individual;

obtaining selection of at least one individual depicted in the live video based on operation of the selection tool to designate at least one selected facial feature vector corresponding to the selected at least one individual;

comparing facial feature vectors in a facial region of each of individuals depicted in the live video with the selected at least one facial feature vector corresponding to the selected at least one individual;

converting the segmentation masks of individuals with a corresponding body region to a filter mask when the facial feature vectors do not match the selected facial feature vector;

compositing the filter mask comprising facial feature vectors that do not match the selected facial feature vector with a background content of the live video to generate composited background content filtering entire individuals corresponding to the facial features vectors that do not match the selected facial feature vector, wherein filtering entire individuals comprises causing both a body region and a facial region of each individual to be hidden from view in the viewing window;

applying a graphical effect to the composited background content; and displaying a modified video comprising the segmentation mask and the composited background content when the selected at least one individual is in a field of view of the webcam.

2. The method of claim 1, wherein the graphical effect comprises a blurriness effect.

3. The method of claim 2, wherein the user interface further comprises an adjustment tool for adjusting a degree in which the blurriness effect is applied to the composited background content.

4. The method of claim 1, wherein the graphical effect comprises a color substitution effect whereby a color is substituted for the entire composited background content.

5. The method of claim 1, wherein the graphical effect comprises replacement multimedia content inserted in place of the individuals associated with the filter mask, wherein the multimedia content comprises at least one of an image or a video.

6. The method of claim 4, wherein the user interface further comprises a color tool for selecting the color of the color substitution effect.

7. The method of claim 1, wherein the selection obtained based on operation of the selection tool comprises a plurality of individuals depicted in the live video, and wherein the displayed modified video comprises a plurality of segmentation masks and the composited background content.

8. The method of claim 1, wherein the modified video comprises only the composited background content when the selected at least one individual is not in the field of view of the webcam.

9. The method of claim 1, wherein responsive to the selected at least one individual exiting and re-entering the field of view of the webcam, only the following steps are repeated:

comparing facial feature vectors in a facial region of each of individuals depicted in the live video with the selected at least one facial feature vector corresponding to the selected at least one individual;

converting the segmentation masks of individuals with a corresponding body region to a filter mask when the facial feature vectors do not match the selected facial feature vector;

compositing the filter mask comprising facial feature vectors that do not match the selected facial feature vector with a background content of the live video to generate composited background content filtering entire individuals corresponding to the facial features vectors that do not match the selected facial feature vector, wherein filtering entire individuals comprises causing both a body region and a facial region of each individual to be hidden from view in the viewing window;

applying a graphical effect to the composited background content; and displaying a modified video comprising the segmentation mask and the composited background content when the selected at least one individual is in a field of view of the webcam.

10. A system, comprising:
a webcam;
a memory storing instructions;
a processor coupled to the memory and configured by the instructions to at least:

generate a user interface, the user interface including a viewing window, the user interface further comprising a toolbar including a selection tool;

display a live video depicting at least one individual in the viewing window of the user interface;

generate at least one segmentation mask for the at least one individual depicted in the live video, wherein each of the at least one segmentation mask comprises a body region of each individual and facial feature vectors of a facial region of each individual, wherein each facial feature vector is generated from facial features of each individual, wherein the facial feature vectors are derived by a facial recognition technique, and wherein a separate segmentation mask is generated for each individual, each separate segmentation mask comprising a body region and facial feature vectors of a facial region of a corresponding individual;

obtain selection of at least one individual depicted in the live video based on operation of the selection tool to designate at least one selected facial feature vector corresponding to the selected at least one individual;

compare facial feature vectors in a facial region of each of individuals depicted in the live video with the selected at least one facial feature vector corresponding to the selected at least one individual;

convert the segmentation masks of individuals with a corresponding body region to a filter mask when the facial feature vectors do not match the selected facial feature vector;

composite the filter mask comprising facial feature vectors that do not match the selected facial feature vector with a background content of the live video to generate composited background content filtering entire individuals corresponding to the facial features vectors that do not match the selected facial feature vector, wherein filtering entire individuals comprises causing both a body region and a facial region of each individual to be hidden from view in the viewing window;

apply a graphical effect to the composited background content; and display a modified video comprising the segmentation mask and the composited background content when the selected at least one individual is in a field of view of the webcam.

11. The system of claim 10, wherein the graphical effect comprises a blurriness effect.

12. The system of claim 11, wherein the user interface further comprises an adjustment tool for adjusting a degree in which the blurriness effect is applied to the composited background content.

13. The system of claim 10, wherein the graphical effect comprises a color substitution effect whereby a color is substituted for the entire composited background content.

14. The system of claim 10, wherein the graphical effect comprises replacement multimedia content inserted in place of the individuals associated with the filter mask, wherein the multimedia content comprises at least one of an image or a video.

15. A non-transitory computer-readable storage medium storing instructions to be implemented by a computing device having a processor, wherein the instructions, when executed by the processor, cause the computing device to at least:

generate a user interface, the user interface including a viewing window, the user interface further comprising a toolbar including a selection tool;

display a live video depicting at least one individual in the viewing window of the user interface;

generate at least one segmentation mask for the at least one individual depicted in the live video, wherein each of the at least one segmentation mask comprises a body region of each individual and facial feature vectors of a facial region of each individual, wherein each facial feature vector is generated from facial features of each individual, wherein the facial feature vectors are derived by a facial recognition technique, and wherein a separate segmentation mask is generated for each individual, each separate segmentation mask comprising a body region and facial feature vectors of a facial region of a corresponding individual;

obtain selection of at least one individual depicted in the live video based on operation of the selection tool to designate at least one selected facial feature vector corresponding to the selected at least one individual;

compare facial feature vectors in a facial region of each of individuals depicted in the live video with the selected at least one facial feature vector corresponding to the selected at least one individual;

convert the segmentation masks of individuals with a corresponding body region to a filter mask when the facial feature vectors do not match the selected facial feature vector;

composite the filter mask comprising facial feature vectors that do not match the selected facial feature vector with a background content of the live video to generate composited background content filtering entire individuals corresponding to the facial features vectors that do not match the selected facial feature vector, wherein filtering entire individuals comprises causing both a body region and a facial region of each individual to be hidden from view in the viewing window;

apply a graphical effect to the composited background content; and display a modified video comprising the segmentation mask and the composited background content when the selected at least one individual is in a field of view of the webcam.

* * * * *